United States Patent Office 3,337,533
Patented Aug. 22, 1967

3,337,533
AZIRIDINYL CARBAMATES
George E. Ham, Lake Jackson, Tex., assignor to The Dow Chemical Company, Midland, Mich., a corporation of Delaware
No Drawing. Filed Nov. 26, 1963, Ser. No. 326,187
12 Claims. (Cl. 260—239)

This invention relates to carbamates which contain an aziridinyl ring, to polymers containing such carbamates and to methods of producing such carbamates and carbamate-containing compositions.

It is known that phenyl isocyanates react with compounds such as ethylenimine and propylene imine which contain a hydrogen atom bonded directly to the heterocyclic nitrogen atom to form the corresponding urea derivatives. Such reactions frequently produce polymers and are disclosed by Esselmann et al. in U.S. Patent 2,257,162. It is also well known that alkanols react with phenyl isocyanates to form carbamates.

It has now been found that aziridinylalkanols react with isocyanates without cleavage of the aziridinyl group to form esters of carbamic acid which are useful as curing agents for styrene-maleic anhydride copolymers. The reaction by which the novel compounds are prepared may be represented by the following equation:

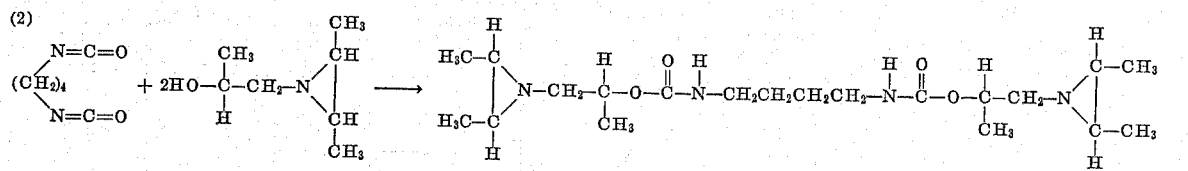

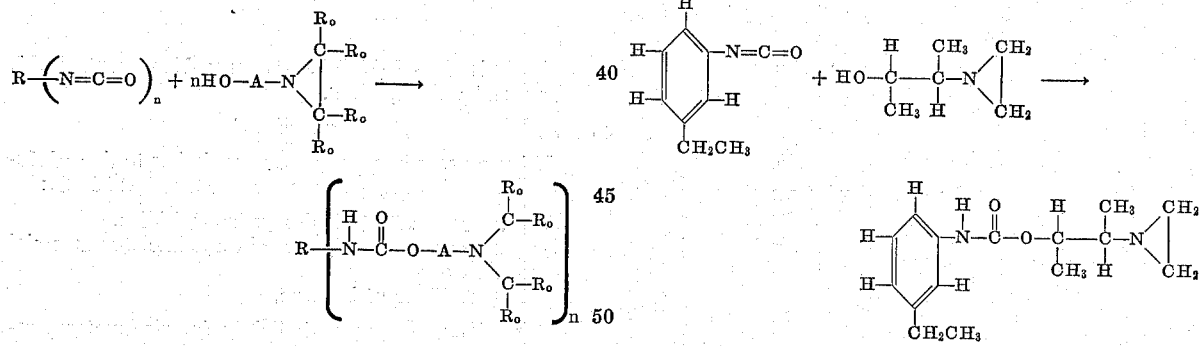

wherein $n$ is an integer of from 1 to 2 which is equal to the valence of R and represents the number of isocyanate groups attached thereto, R is a hydrocarbon group of from 1 to 12 carbon atoms (including alkaryl groups such as tolyl and ethyl- and methyl-substituted naphthyl groups), A is a divalent alkylene or arylene group of from 2 to 8 carbon atoms and each $R_o$ is independently selected from the group consisting of the hydrogen atom and a lower alkyl group of from 1 to 4 carbon atoms (methyl, ethyl, n-propyl, i-propyl, n-butyl, i-butyl, sec.-butyl and tert.-butyl). As used herein, the term "aziridinyl" is meant to include both substituted and unsubstituted aziridine rings, i.e.,

A preferred subclass of divalent-A-groups include those of the formula

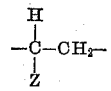

wherein Z is a hydrogen atom, a phenyl group or a lower alkyl group of from 1 to 4 carbon atoms.

Typical preparative reactions include the following:

(1)
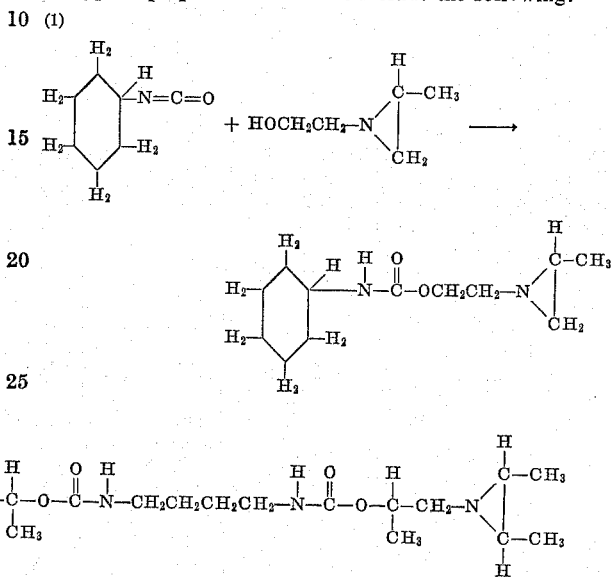

(3)
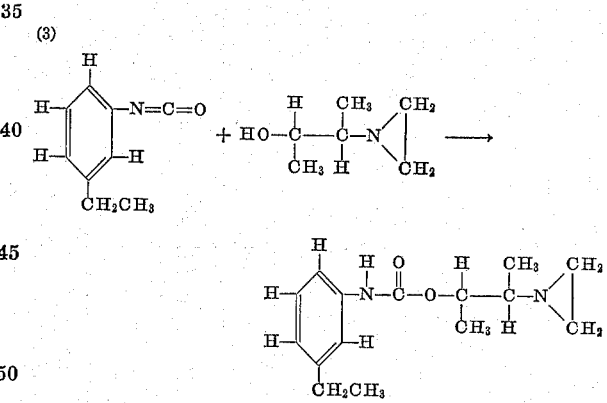

Other suitable isocyanate starting materials include alkenyl isocyanates of up to 7 or 8 carbon atoms, such as 3-cyclohexenyl isocyanate. Non-olefinic hydrocarbyl isocyanates of up to 12 carbon atoms are preferred starting materials.

Mixtures of isocyanates may also be used as starting materials. After reaction of the mixture with a suitable aziridinyl alcohol, the reaction product may be separated into individual compounds by chromatographic methods, or the mixture of products may be used without further purification as curing agents. For example, commercial tolylene diisocyanate is composed of an 80:20 (weight) mixture of 2,4-tolylene diisocyanate and 2,6-tolylene diisocyanate. This mixture may be reacted with 1-(2-hydroxyethyl)aziridine to produce a mixture of the corresponding carbamate isomers which may be used as crosslinking agents without further separation.

The process by which the carbamates of the invention are prepared may be carried out at temperatures of from about 20° to 150° C., with temperatures of from about 28° to 50° C. being preferred. The reaction is exothermic and additional heat is usually not required in order to carry out the reaction. Stoichiometric amounts of reactants (one molecule of aziridinyl alcohol for every isocyanate group) are preferred, but the reaction may also be carried out using an excess of either reactant (for example, a ten percent molar excess of either reactant can be used). The reaction is not pressure sensitive and pressures from a few hundredths of a millimeter of mercury up to several hundred atmospheres may be used, although no particular economic advantage is obtained thereby. The reaction is most conveniently carried out by mixing stoichiometric amounts of the reactants at atmospheric pressure and allowing the mixture to exotherm at temperatures of from 25° o 150° C. The reaction may be carried out either with or without a suitable inert solvent such as benzene, toluene, hexane, $CCl_4$, ethylene dichloride, etc.

The compounds of the invention are especially useful as curing agents for styrene-maleic anhydride copolymers. The cured products form useful protective coatings for articles such as table tops and cabinets. Prior to curing, the blend of styrene-maleic anhydride-carbamate may be applied to layers of plastic, wood or other materials and then heat-cured to form waterproof laminated products of increased strength. Any styrene-maleic anhydride copolymer may be used. Ordinarily, a (weight) mixture of from 0.25:1 to 1.75:1 of styrene:maleic anhydride is used, and preferably a 1:1 (equimolar) mixture. The carbamate is added to this mixture in an amount sufficient to provide a blend with an aziridinyl group for every maleic anhydride molecule. This blend may be diluted with a suitable solvent such as methyl ethyl ketone (or used without a solvent) and poured or spread as a film on the article to be coated. If a solvent is used, the solvent is evaporated and the film is then cured at temperatures of from 75° to 175° C. for from 5 minutes to 72 hours. The resulting coating is clear and has good resistance against solvents such as acetone, ethylene dichloride, toluene and water.

The compounds of the invention are stable at room temperature and do not deteriorate rapidly. Samples stored for over five months showed only a slight reduction in aziridinyl content.

The following examples are submitted for the purpose of illustration only and are not to be construed as limiting the scope of the invention in any way.

*Example I.—General Procedure*

Into a reaction vessel equipped with a means for stirring, temperature control and refluxing was placed a solution of 8.7 grams of 1-(2-hydroxyethyl)-aziridine dissolved in 100 milliliters of $CCl_4$ and a second solution of 11.9 grams of phenyl isocyanate dissolved in 100 milliliters of $CCl_4$. The two solutions were combined at 25° C. and immediately an exothermic reaction began with the temperature rising to 42° C. Upon completion of the reaction (about 30 minutes), the temperature dropped to 25° C. The $CCl_4$ was removed under reduced pressure and there was obtained 15.3 grams of product [2-(1-aziridinyl)ethyl carbanilate] with a melting point of 86.5° to 89° C. The infrared spectrum was consistent with that expected for:

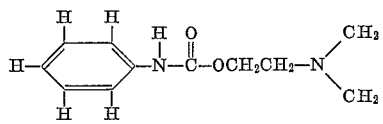

Analysis ($C_{11}H_{14}N_2O_2$).—Theory: N percent, 13.58; Aziridinyl group ($C_2H_4N$) percent, 20.6. Actual: N percent, 13.50; Aziridinyl group ($C_2H_4N$) percent, 19.9.

*Example II*

Using the procedure and apparatus similar to that of Example I, the following were combined at about 25° C.:

(a) 8.7 grams of 1-(2-hydroxyethyl)aziridine in 100 milliliters of benzene, and (b) 13.3 grams of o-tolylisocyanate in 100 milliliters of benzene.

The reaction mixture exothermed slightly (maximum temperature: about 35° C.). From the reaction mixture was obtained 22.4 grams of a clear viscous liquid (after removal of the solvent under vacuum) with an infrared spectrum which was consistent with that expected for:

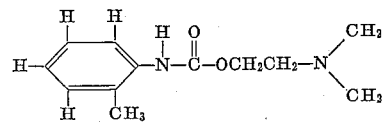

[2-(1-Aziridinyl)ethyl o-tolylcarbamate]

Analysis ($C_{12}H_{16}N_2O_2$).—Theory: N percent, 12.7. Actual: N percent, 13.6.

*Example III*

Using a procedure and apparatus similar to that of Example I, the following were combined at about 25° C.:

(a) 8.7 grams of 1-(2-hydroxyethyl)aziridine,
(b) 16.9 grams of 1-naphthyl isocyanate, and
(c) 200 milliliters of benzene.

The reaction mixture exothermed slightly (maximum temperature: about 35° C.). By removal of the solvent under vacuum, 28.0 grams of solid 2-(1-aziridinyl)ethyl 1-naphthylcarbamate (melting point: 98.7°–99.5° C.) was separated from the reaction mixture. The infrared spectrum was consistent with that expected for:

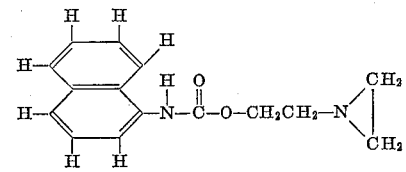

Analysis ($C_{15}H_{16}N_2O_2$).—Theory: N percent, 10.90. Actual: N percent, 10.79.

*Example IV*

Using a procedure and apparatus similar to that of Example I, the following were combined at about 25° C.:

(a) 17.4 grams of 1-(2-hydroxyethyl)aziridine,
(b) 17.5 grams of tolylene diisocyanate (commercial product), and
(c) 200 milliliters of benzene.

The mixture exothermed slightly (maximum temperature: about 35°–40° C.). The product (8.2 grams) was separated from the reaction mixture by filtration and had an infrared spectrum consistent with that expected for the following structure

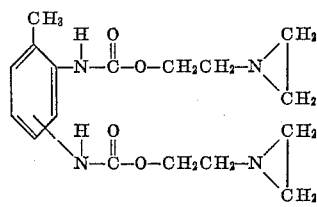

*Example V*

Using a procedure and apparatus similar to that of Example I, the following were combined at about 25° C.:

(a) 17.4 grams of 1-(2-hydroxyethyl)aziridine,
(b) 16.8 grams of hexamethylene diisocyanate, and
(c) 200 milliliters of benzene.

The reaction mixture exothermed slightly (maximum temperature: about 30°–40° C.). The solid product (21.0 grams) was separated from the reaction mixture by filtration and had an infrared spectrum consistent with that expected for the following structure [bis(2-1-aziridinyl) hexamethylene dicarbamate]:

$$\left( \begin{matrix} CH_2 \\ | \\ N-CH_2CH_2-O-\overset{O}{\underset{||}{C}}-\overset{H}{\underset{|}{N}} \\ | \\ CH_2 \end{matrix} \right)_2 (CH_2)_6$$

Analysis ($C_{16}H_{30}N_4O_4$).—Theory: N percent, 16.26. Actual: N percent, 16.63.

The melting point (with decomposition) was about 240° C.

*Example VI*

Following the procedure and using an apparatus similar to that of Example I, the following were combined at about 25° C.:

(a) 10.1 grams of 1 - (2 - hydroxy - 2 - methylethyl)-aziridine,
(b) 11.9 grams of phenyl isocyanate, and
(c) 200 milliliters of benzene.

The reaction mixture exothermed to 32° C. The solid product (22.5 grams; melting point: 88.5° to 90.5° C.) was separated from the reaction mixture by filtration and had an infrared spectrum consistent with that expected for 2-(1-aziridinyl)-1-methylethyl carbanilate:

[structure diagram]

Analysis ($C_{12}H_{16}N_2O_2$).—Theory: N percent, 12.71. Actual: N percent, 12.77.

*Example VII*

Following the procedure and using an apparatus similar to that used in the preceding examples, the following were combined at about 25° C.:

(a) 11.5 grams of 1-(2-hydroxy-2-ethylethyl)-aziridine,
(b) 11.9 grams of phenyl isocyanate, and
(c) 200 milliliters of benzene.

The reaction mixture exothermed slightly (maximum temperature: about 30° C.). The solid product (24.5 grams; melting point: 74° C.) was separated from the reaction mixture by removal of solvent under vacuum and had an infrared spectrum consistent with that expected for 2-(1-aziridinyl)-1-ethylethyl carbanilate:

[structure diagram]

Analysis ($C_{13}H_{18}N_2O_2$).—Theory: N percent, 11.96. Actual: N percent, 11.65.

*Example VIII*

Following the procedure and using an apparatus similar to that used in the preceding examples, the following were combined at about 25° C.:

(a) 1.63 grams of 1-(2-hydroxy-2-phenylethyl)-aziridine,
(b) 1.19 grams of phenyl isocyanate, and
(c) 20 milliliters of benzene.

The reaction mixture exothermed slightly (maximum temperature: about 30° C.). The solid product (1.4 grams; melting point: 110°–112° C.) was separated from the reaction mixture by filtration and had an infrared spectrum which was consistent with that expected for 2-(1-aziridinyl)-1-phenylethyl carbanilate:

[structure diagram]

*Example IX*

The compound [2-(1-aziridinyl)ethyl carbanilate] of Example I was tested as a curing agent for styrene-maleic anhydride copolymer.

A one-gram sample of the styrene-maleic anhydride copolymer was dissolved in 10 milliliters of methyl ethyl ketone. This copolymer was formed by combining about equal weights of maleic anhydride and styrene.

The compound, 2-(1-aziridinyl)ethyl carbanilate, was placed in an additional 10 milliliters of methyl ethyl ketone. The two mixtures were combined and spread as a film on a 4" x 12" x 1/16" bonderized steel plate. After solvent evaporation, the film thickness was about 0.5 mil (.0005 inch). The bonderized plate containing the film was cured at 140° C. for 15 minutes. A clear film of fair adhesion was obtained which was not effected by solvents such as acetone, ethylene dichloride, toluene and water. The solvent test was performed by placing droplets of the solvent on the plate for 15 minutes at room temperature (25° C.) in an atmosphere of solvent vapor.

The compounds of Examples II–VIII function similarly as curing agents for styrene-maleic anhydride copolymers when used in amount sufficient to provide at least one aziridinyl group per maleic anhydride molecule.

I claim as my invention:

1. A compound of the formula

[structure diagram]

wherein:

(a) $n$ is an integer from 1 to 2 which represents the valence of R,
(b) R is a hydrocarbon group of from 1 to 12 carbon atoms,
(c) A is a divalent group of from 2 to 8 carbon atoms selected from the group consisting of an alkylene radical and an arylene radical, and
(d) each $R_o$ is independently selected from the group consisting of the hydrogen atom and a lower alkyl group of from 1 to 4 carbon atoms.

2. A compound of the formula

[structure diagram]

wherein:

(a) $n$ is an integer of from 1 to 2 which represents the valence of R,
(b) R is an aryl group of from 6 to 12 carbon atoms,
(c) each $R_1$ is independently selected from the group consisting of the hydrogen atom, a lower alkyl group of from 1 to 4 carbon atoms and a phenyl group, and
(d) each $R_o$ is independently selected from the group consisting of the hydrogen atom and a lower alkyl group of from 1 to 4 carbon atoms.

3. The compound of claim 2 wherein R is an alkylene group of from 1 to 12 carbon atoms.

4. A compound of the formula

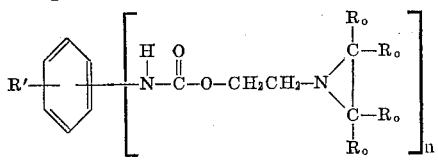

wherein:
(a) $n$ is an integer from 1 to 2 which represents the number of nitrogen atoms attached to the aromatic nucleus,
(b) R' is the group $(C_kH_{2k})$H wherein $k$ is an integer from 0 to 2, and
(c) each $R_o$ is independently selected from the group consisting of the hydrogen atom and a lower alkyl group of from 1 to 4 carbon atoms.

5. A compound of the formula

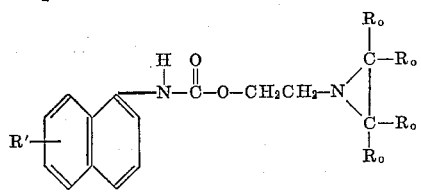

wherein each unsubstituted carbon atom on the aromatic nucleus is bonded to a hydrogen atom and wherein:
(a) R' is the group $(C_kH_{2k})$H wherein $k$ is an integer from 0 to 2, and
(b) each $R_o$ is independently selected from the group consisting of the hydrogen atom and a lower alkyl group of from 1 to 4 carbon atoms.

6. The compound:

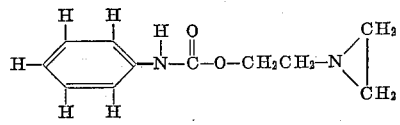

7. The compound:

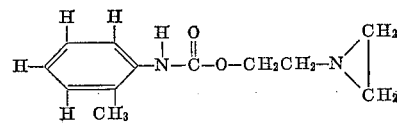

8. The compound:

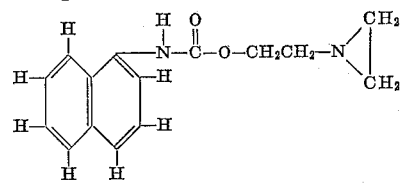

9. The compound:

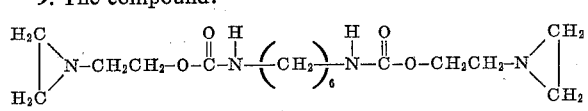

10. The compound:

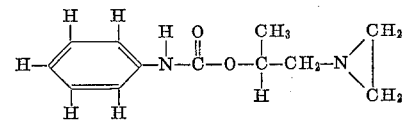

11. The compound:

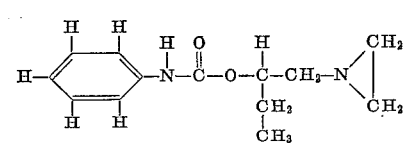

12. The compound:

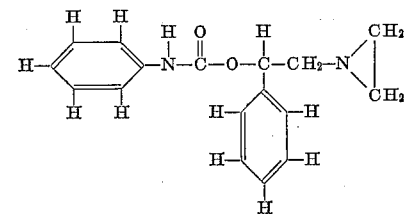

No references cited.

ALEX MAZEL, *Primary Examiner.*
JOSEPH L. SCHOFER, *Examiner.*
L. G. CHILDERS, *Assistant Examiner.*